United States Patent [19]

Ullrich et al.

[11] 4,318,773

[45] Mar. 9, 1982

[54] PROCESS FOR THE CONCENTRATION OF SOLUTIONS WITH SIMULTANEOUS SETTING

[75] Inventors: Martin Ullrich; Manfred Hederich, both of Leverkusen; Karl-Friedrich Jerchel, Krefeld, all of Fed. Rep. of Germany

[73] Assignee: Bayer Aktiengesellschaft, Leverkusen, Fed. Rep. of Germany

[21] Appl. No.: 902,190

[22] Filed: May 2, 1978

[30] Foreign Application Priority Data

May 14, 1977 [DE] Fed. Rep. of Germany ....... 2721848

[51] Int. Cl.$^3$ ............................................. B01D 1/22
[52] U.S. Cl. ................. 159/47 R; 159/2 E; 159/6 WH
[58] Field of Search ............... 159/2 E, 6 R, 6 WH, 159/47; 528/501, 502

[56] References Cited

U.S. PATENT DOCUMENTS

| | | | |
|---|---|---|---|
| 3,078,511 | 2/1963 | Street | 159/2 E |
| 3,382,536 | 5/1968 | Fritsch et al. | 159/2 E |
| 3,738,409 | 6/1973 | Skidmore | 159/2 E |
| 3,741,272 | 6/1973 | Ullrich et al. | 159/2 E |
| 3,749,375 | 7/1973 | Hermann et al. | 159/2 E |
| 3,874,090 | 4/1975 | McCracken | 159/2 E |
| 3,997,406 | 12/1976 | Arvanitakis | 159/2 E |
| 4,107,787 | 8/1978 | Ocker | 159/2 E |

*Primary Examiner*—Norman Yudkoff
*Attorney, Agent, or Firm*—Sprung, Felfe, Horn, Lynch & Kramer

[57] ABSTRACT

Liquid solutions are evaporated to their setting points and the set material so formed is crushed in a screw machine. The phase conversion from the still viscous state to the flowable crushed solid state is carried out in a single closed housing zone of the screw machine and comprises simultaneous evaporation, setting, crushing and further concentration.

11 Claims, 7 Drawing Figures

PROCESS FOR THE CONCENTRATION OF SOLUTIONS WITH SIMULTANEOUS SETTING

The present invention relates to a process for the continuous concentration of liquid solutions by evaporation, using screw machines, at temperatures below the melting and decomposition points of the dissolved substance, with simultaneous setting during the concentration process and the conversion of the solution into solid crushed particles.

Screw machines for evaporation purposes, so-called screw evaporators, are known and are described in detail by H. Herrmann in "Schneckenmaschinen in der Verfahrenstechnik" (Springer-Verlag 1972). This article distinguishes between screw driers or screw evaporators for bulk goods in a totally solid phase, for example, for the drying of humid cereals, and screw evaporators for materials in a totally plastic or viscoelastic phase, for example, for the vacuum degassing or drying of rubber-like plastics compositions or for the removal of water, solvents or remains of monomers from polymer solutions which are converted from the liquid solution into a high viscosity polymer melt by evaporation above the melting point of the dissolved substance. The high viscosity melts of thermoplastic polymers, substantially freed of the volatile substances, are ejected, in a thick liquid state, from the end of the screw evaporator and are granulated in the usual manner.

In addition, a process for the production of solutions of high molecular polycarbonates suitable for the production of threads and films is known from German Offenlegungsschrift No. 2,004,517, in which polycarbonates having a molecular weight above 30,000 are converted from their solutions by means of solvent evaporation at temperatures below their melting point into solid solutions by the shearing stresses produced in single or multiple-shaft screw machines and the product obtained is then re-dissolved.

In an experiment to convert various polymer solutions, including polycarbonates, into solid solutions by this process, it has been found that it is not possible, according to the state of the art described above, to carry out evaporation with simultaneous setting without meeting difficulties and obtaining considerable disturbances in its continuous operation. Exhaustive investigations have shown that in the known process:

(a) The outlet zones of the screw evaporator, necessarily opened at the top in the manner of a duct, clog in the course of time owing to relatively large, setting lumps of product escaping upwards. The outlet cross-section is thus gradually blocked and the normal functioning of the screw evaporator ceases.

(b) Another disadvantage of the phenomenon described under (a) is that the screw evaporator has a tendency to block. The above mentioned lumps of product escaping through the outlet shaft are able to coalesce in the still plastic state to larger clods, then dry out over a prolonged period and are cured by the prevailing temperature and may by chance be drawn back into the system by the rotating screw shafts.

These lumps are, however, then so large and so hard that they can no longer pass into the screw duct and thus block the screw shafts like a brake block. This interferes considerably with operation. The clogged outlet shafts of a screw evaporator which has been stopped so forcibly have to be cleared out manually by opening the machine. It is also possible to re-dissolve the solid lumps of product by flushing the screw evaporator with a solvent but this requires very long periods since only very slow diffusion of the solvent will lead, gradually to the re-softening of the lumps.

(c) Even if this does not result in the considerable disruption of operation described under (b), the smaller lumps of product which happen to be drawn in again and which may not be large enough to block the machine are sufficient to lead to an non-homogeneous product. These lumps have resided under the temperature conditions of the outlet zone for much longer than the main composition of the product which moves uniformly through the screw evaporator and may thus be altered thermally or be damaged and are now mixed back into the normal main product. The main product is thus impaired by non-homogeneous areas which means it is impaired in total by not having a uniform quality.

The present invention relates to the continuous concentration of liquid solutions by evaporation below the melting and decomposition points of the dissolved substance with simultaneous setting during the concentration process and with simultaneous conversion of the thickening, setting solution into solid crushed particles. The entire process is to be carried out within a continuously operating screw machine, reliably and without interruption, even over long periods. The specified object comprises the following four steps:

1. Evaporation and concentration.
2. Setting, that is phase conversion from the viscous to the solid state.
3. Crushing to small particles, prevention of formation of lumps and clods of product.
4. Further concentration and drying until flowability of the crushed particles is achieved without tendency to secondary caking.

These four steps are to be carried out in a screw machine with the provision of a uniform quality of product and high reliability.

According to the invention there is provided a process for the continuous concentration of liquid solutions by evaporation below the melting and decomposition points of the dissolved substance with simultaneous setting and the conversion of the solution into solid crushed particles in a screw machine, wherein the critical phase conversion from the still viscous state to the flowable crushed solid state is carried out in a single closed housing zone of the screw machine and comprises simultaneously the evaporation, the setting, the crushing and further concentration.

The critical phase conversion preferably takes place between two outlet zones or at the end of a screw evaporator.

Multi-shaft screw machines with screw shafts which engage in pairs and rotate in the same direction in pairs are preferably used for the process according to the invention. Two-shaft or four-shaft machines are particularly suitable.

The term "closed housing zone" means here a housing zone completely enclosing in its cross-section apart from the mechanically conventional radial clearance between screw outer diameter and housing wall—the screw shaft or several screw shafts on its periphery.

The expression "with critical phase conversion from the still viscous state to the flowable crushed solid state" here means a critical range whose significant limits may easily be determined in an laboratory experiment or may easily be observed in the screw evaporator by means of sight glasses. This range commences at the point where the thickening solution may indeed already be very viscous but must still be sufficiently flowable not to adhere to the outlet shaft wall of a screw evaporator and set there with the formation of a crust. The range finishes with a flowable crushed mixture of particles which can just no longer cake.

The range is known as a critical range because extremely unmanageable, glutinous adhering material consistencies are produced between the specified limits and lead to the clogging of the shaft-like opened outlet zones of screw evaporators. It was not expected that the said evaporation of substantial quantities of solvent, required for carrying out the critical phase conversion from the still viscous state to the flowable crushed solid state, could be carried out economically in a closed housing zone. In this process, considerable volumes of vapour are in fact produced and have to find room together with the concentrate in the narrow winding screw duct. In contrast to this, in the known screw evaporators, these large quantities of vapour flow freely upwards in shaft-like outlet zones of large crosssection opened at the top which are provided for this purpose at right angles to the liquid stream of concentrate. According to the invention, the correspondingly large quantities of vapour have to flow, together with the concentrate, throughout the entire closed housing zone following the screw duct which has multiple windings and a very small cross-section of flow, until they reach the end of this closed housing zone and are able to issue into a larger space. A considerable drop in pressure therefore has to be controlled in the closed housing zone because of this flow of vapour and this would in turn lead to the expectation that the outlet in the first part of the closed housing zone will thereby be obstructed (higher boiling point of the solution at higher pressure).

On the contrary, the process according to the invention may be carried out with economical volume flows. Firstly, the measures according to the invention allow an untroubled steady continuous screw process with high reliability and uniform quality of product. In addition, the above-mentioned four different procedural steps (evaporation, setting, crushing, further concentration and drying to flowability) may be integrated into a single reliable practically simultaneous stage of production within one screw machine. This forms a basis for an economically feasible process, since a considerable number of stages of production would be necessary to achieve the same goal, for example evaporator, cooling roller, mill and dryer in succession. Another advantage is that the crushed product is strikingly uniform.

With reference to the accompanying drawings

FIGS. 1 to 3 show diagrammatically three exemplary embodiments of the process according to the invention.

Figure 1:
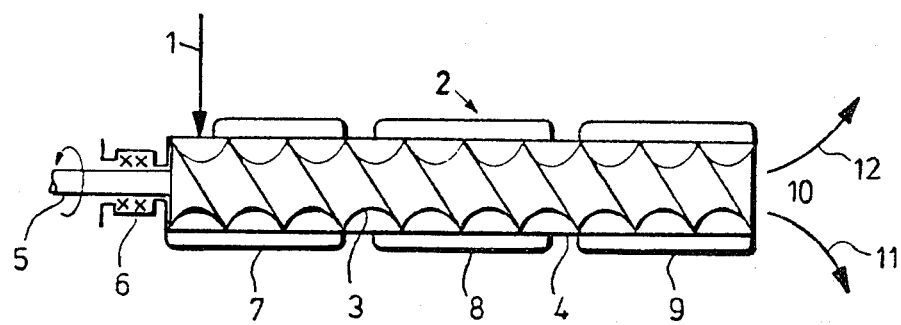
FIG. 1 shows a screw machine with a single closed housing zone.

FIG. 1 shows a screw machine with only the closed housing zone. The solution which has already been pre-concentrated in a preliminary apparatus (not shown here) to a state at the beginning of the critical range described above and which is still viscous is metered at position 1 and introduced into the screw machine 2. Evaporators and, in special cases, also screw evaporators, are suitable preliminary apparatus. If the preliminary evaporator does not emit the stream of material uniformly, a metering pump is provided upstream of position 1. The screw machine 2 consists of a screw shaft or shafts 3 and a housing zone 4 completely enclosing them in the cross-section apart from the clearance. The drive journal 5 of the screw shaft(s) 3 is sealed by a conventional shaft seal 6. The closed housing zone 4 may be a temperature regulated by means of one or more heating jackets 7, 8, 9. In this case, the temperature control is effected by means of liquid or vaporous heat carriers. However, heating by means of electrical filament windings is also feasible, and is a means frequently applied in screw machines. The concentrate 11 issues from the end 10 of the screw in a set, flowable, crushed state, together with the solvent vapour 12 liberated in the closed housing zone 4 which flows away. Conventional devices (not shown here) are connected downstream of the screw machine, if necessary, for separating the solid flow from the vapour stream, for condensing the vapour, thereby recovering the solvent, and optionally, for further drying of the flowable crushed solid.

Figure 2:
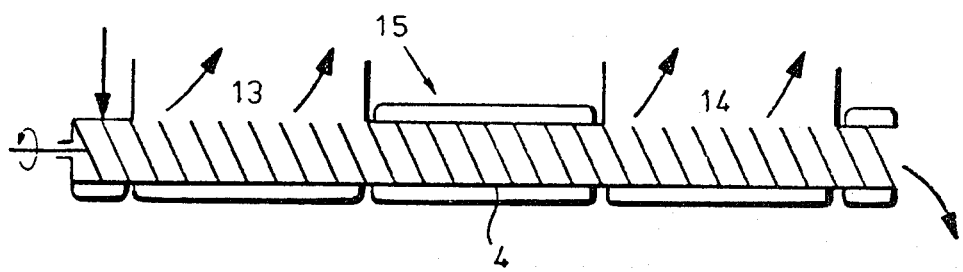
FIG. 2 shows an embodiment in which the closed housing zone is arranged between two outlet zones of a screw evaporator.

FIG. 2 shows a preferred embodiment of the process according to the invention wherein the closed housing zone 4 in which the critical phase conversion from the viscous to the solid state takes place is arranged between two outlet zones 13 and 14 of a screw evaporator 15. Here, evaporation and concentration in the still liquid range preceding the critical phase conversion, and the subsequent drying in the flowable crushed solid state take place in the same screw machine as does the critical phase conversion itself.

Figure 3:
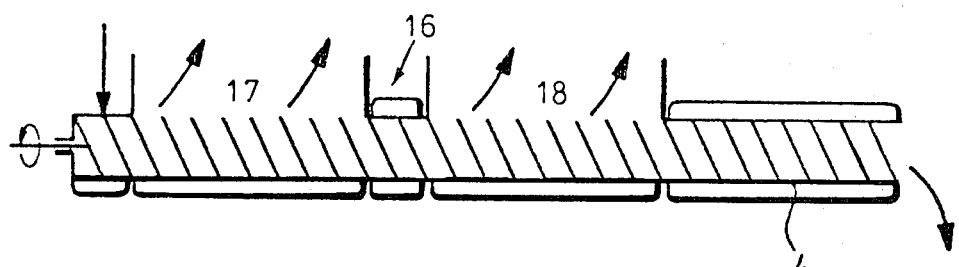
FIG. 3 shows an embodiment in which the closed housing zone is arranged at the end of a screw evaporator.

FIG. 3 shows another preferred embodiment of the process according to the invention wherein the closed housing zone 4 in which the critical phase conversion viscous-solid takes place is arranged at the end of a screw evaporator 16 upstream of the outlet zones 17 and 18. Evaporation and concentration in the still liquid range preceding the critical phase conversion is carried out in the same screw machine as is the critical phase conversion itself.

If the operations preceding or following the critical phase conversion as mentioned with reference to FIGS. 2 and 3 are necessary, it may be beneficial and economically feasible to carry them out in the same screw machine as that in which the critical phase conversion occurs.

Figure 4:
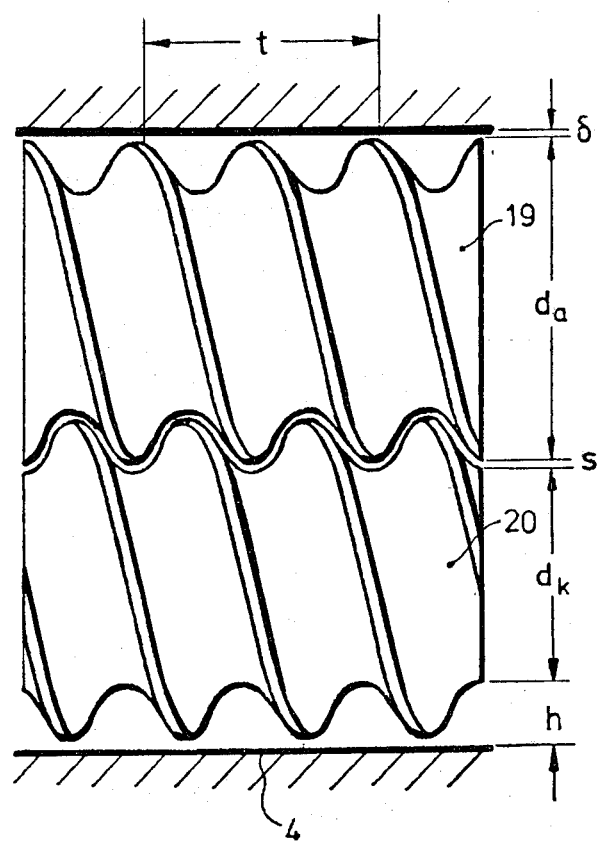
FIG. 4 is a longitudinal section of a machine having two interengaging screw shafts, rotating in the same direction.
Figure 5:
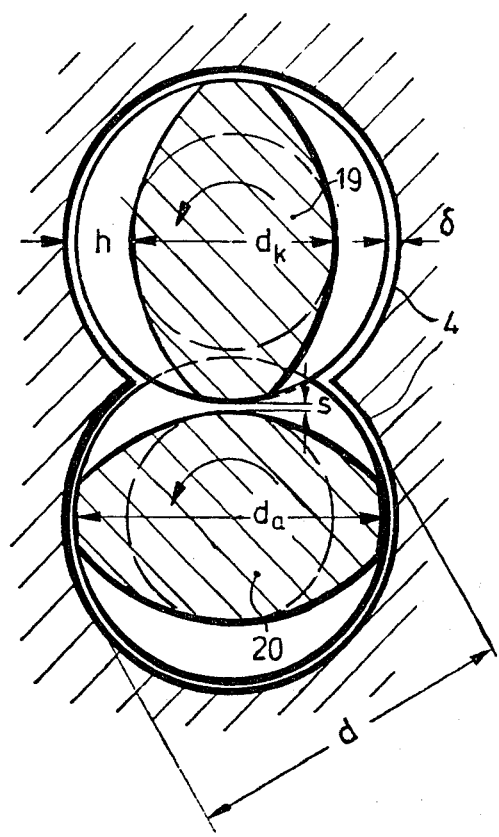
FIG. 5 is a cross-section of the two interengaging screw shafts in FIG. 4.

In other preferred embodiments of the process according to the invention, evaporation with simultaneous setting is carried out in multi-shaft screw machines with screw shafts which engage in pairs and rotate in the same direction in pairs, preferably in two- and four-shaft screw machines. Such screw machines are known from German Pat. No. 862,668 and German Pat. No. 1,111,154 and also from the book by H. Herrmann quoted above. FIGS. 4 and 5 show by way of example such interengaging two screw shafts rotating in the same direction (here with doublelead screw thread) in a longitudinal section and cross-section. Such screw machines are kinematically forcibly self-cleaning apart from the mechanically necessary small clearances δ (between screw external diameter $d_a$ and housing internal diameter d) and s (between the two engaging screw shafts) and this is a feature which makes these screw machines particularly suitable for the process according to the invention. FIG. 5 shows the cross-section with the housing zone 4 completely enclosing the screw shafts 19 and 20 at its outer periphery but for the clearance δ.

Figure 6:
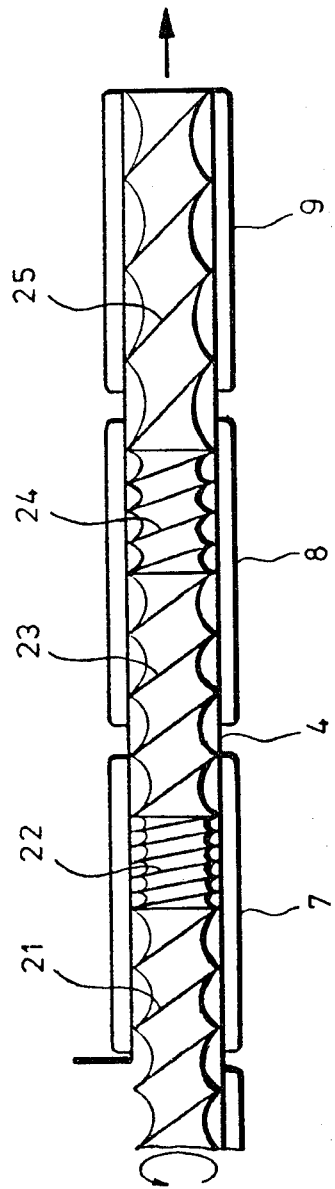
FIGS. 6 and 7 show preferred embodiments for carrying out the process according to the invention with special screw geometry.
Figure 7:
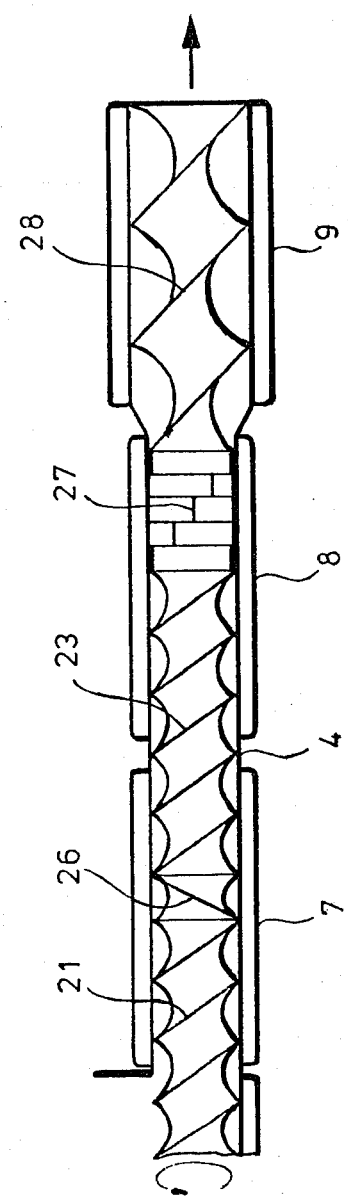

FIGS. 6 and 7 show preferred embodiments of the design of the screw geometry for carrying out the process according to the invention which are particularly effective. To this end, a particular geometric configuration of the screw shafts in the closed housing zone 4 is required. Thus, a zone 22 having greatly reduced screw pitch or a short braking thread 26 with opposed twist is provided at the beginning, i.e., for example, in the first third of the closed housing zone 4 immediately after the screw pitch 21 (screw pitch t, see FIG. 4). These element 22 or 26 has a sealing effect against the large quantities of vapour formed downstream thereof owing to high product filling in the region of these elements, which quantities of vapour must not flow backwards against the screw conveyance since they would otherwise obstruct the forward conveyance of the viscous solution. The requirements of this sealing zone may also be fulfilled by temperature control by means of the thermal control zone 7.

A region 23 of larger screw pitch follows this sealing zone to which region large quantities of energy may be fed for evaporating the solvent via the heating zone 8. A zone 24 with a smaller pitch or a kneading conveying element 27 is subsequently positioned. Kneading conveying elements formed in the manner of spiral steps from several kneading discs are known from German Pat. No. 813,154 and German Pat. No. 940,109. The elements 24 and 27 have the additional function here, in the production of phase conversion and setting, to mechanically supply further energy to the substance being externally heated within the heating zone 8 by kneading and shearing the products thereby accelerating their concentration and setting. At the same time, they crush any of the substance which is already setting there. This is particularly significant since it does not take place in the brittle and solid state of the substance as in the case of milling, but in a material consistency which is still just plastic and is setting in the shear zones between the screw external diameter and the housing, and is particularly intensive when using the element 27 between the points of the kneading element and the housing and in the cooperation of two corresponding kneading discs.

Elements 25 having a very large screw pitch t or elements 28 having a thread depth h increased in relation to the previously used elements are preferably arranged at the end, i.e., for example in the last third of the closed housing zone 4 downstream after the elements 24 and 27 just mentioned (thread depth h, see FIG. 5). By these measures, the desired path in the screw conveyance direction is simplified for the large quantities of vapour liberated in the closed housing zone 4. Further concentration and drying to the flowable state of the crushed particles is also effected in this region. A decisive influence may be exerted by the heating zone 9.

The elements 21 to 28 whose functioning in the process according to the invention is described in detail with reference to FIGS. 6 and 7, may also be combined in another manner apart from that shown in FIGS. 6 and 7 which are to be taken only as examples. Thus, for example, the elements 22 and 24 in FIG. 6 may also be placed together.

In addition, element 27 from FIG. 7 may also be used in FIG. 6 instead of element 24. The same applies for element 25 from FIG. 6 in FIG. 7 instead of element 28 and vice versa. The alternative elements 22 and 26 as well as 24 and 27 mentioned in the description of FIGS. 6 and 7 may also be used in reciprocal combinations.

EXAMPLE 1

(State of the art)

A high molecular polycarbonate having a relative viscosity of 1803 (0.5% in methylene chloride) and a molecular weight of 87,600 is to be converted from a 14% solution in methylene chloride into a flowable crushed solid by evaporating this solution at a temperature below that required by the dissolved polycarbonate for the extrusion of the melt. The temperature required for thermoplastic melt extrusion of this polycarbonate lies in the range of its decomposition temperature at about 380° C. The 14% solution of the specified polycarbonate in methylene chloride has a viscosity at room temperature of 1,500 cP. In order to solve this problem, a two-shaft screw evaporator with engaging adjacent two-lead screw shafts rotating in the same direction and having a screw housing diameter d of 32 mm (see FIG. 5) and a screw length of 1,150 mm was used. When viewed axially in the direction of flow of the material this screw evaporator comprised in succession, an inlet housing with 100 mm clear length, a short closed intermediate area of 100 mm length, a large outlet opening of 400 mm clear length, a short closed housing area of 100 mm length, a second outlet opening with 200 mm clear length and finally a closed ejection area of 250 mm length. This screw evaporator has a structure of the type used, for example, for the known evaporation of liquid polymer solutions to highly viscous melts. The short closed 100 mm intermediate areas between inlet zone and outlet zone as well as between the two outlet zones act as a seal and thus for the adjustment of a differing pressure level in the various zones. The 250 mm long closed ejection area is necessary for the building up of pressure in the viscous finished melts before they pass through the shape-forming nozzle required in liquid operation, at the end of the screw evaporator. The screw shafts were provided with a constant screw pitch of 20 mm over their entire length of 1,150 mm.

The numerous experiments for the continuous evaporation and setting of the above-mentioned polycarbonate-methylene chloride solution carried out in this screw evaporator without an end nozzle at an outlet pressure of 1 bar invariably led to considerable disturbances in the operation after a short period owing to the clogging of the outlet openings by setting clods of product escaping upwards and then adhering and curing on the shaft walls. No remedy was provided by varying the heating temperature of the two outlet zones, and screw speed or the rate of volume flow. The problems described occurred in both outlet openings and usually at the point where the higher heating temperature had been achieved. With hindsight and knowledge as to the solution provided by the invention, this phenomenon may be explained as the occurrence of a critical phase conversion zone in the area of the outlet openings.

A screw evaporator which is put out of order by such disturbances as clogged outlet openings or screw shafts blocked by large clods of cured product, has then to be set in order again by manual systematic coarse cleaning and the time consuming process of detaching of the remaining product. Apart from this operation, there is a risk of the screw machine being damaged by the considerable machanical loads imposed upon the apparatus during this operation which is susceptible to problems.

EXAMPLE 2

(according to the invention)

The object of evaporation with setting mentioned in Example 1 was carried out as follows using the same material system in the same screw evaporator, but using the process according to the invention.

The housing arrangement was initially changed. A 300 mm long, separately heatable, closed housing zone was arranged downstream of the arrangement at the end of the large 400 mm outlet opening, as in Example 1, when viewed in the direction flow of the material. The second outlet opening then followed having a 200 mm clear length and a very short closed housing area of 50 mm. The following geometry was embodied on the two screw shafts in the closed 300 mm housing zone (as viewed from the beginning of the closed housing zone in the direction of flow of the material): a screw pitch of 30 mm for a length of 100 mm, a screw pitch of 20 mm for a length of 60 mm, kneading conveying element of 60 mm length with 5 kneading plates, a screw pitch of 30 mm for a length of 80 mm. All the remaining screw shafts outside the closed housing zone were provided with a screw pitch of 30 mm.

The screw evaporator designed in this manner and operated at an outlet pressure of 1 bar, was heated at from 30° to 40° C. in the inlet housing, at from 80° to 90° C. in the large outlet zone, at from 210° to 220° C. in the closed 300 mm housing zone and at from 220° to 230° C. in the second outlet zone and was supplied with the solution at a flow rate of 26 kg per hour via a toothed wheel matering pump. A solution concentration of 14% with from 30 to 35% polymer content determined from the condensate balance was obtained in the first outlet zone due to marked evaporation. In this process, the solution remainded viscous in the entire region before the outlet opening as was observed through viewing glasses. In contrast, the substance entered the second outlet opening downstream of the closed 300 mm housing zone as a flowable crushed solid, as was observed also through viewing glasses. This product was further concentrated downstream of the second outlet opening at a screw speed of 166 revolutions per minute and ejected with a polymer content of about 90%, a flow-rate of 4 kg per hour and a product temperature of 185° C. 90% of the product had a particle size of between 0.5 and 5 mm.

During this state of operation, the considerable disturbances described in Example 1 did not occur. The process could in fact be carried out very reliably and steadily.

The concentration range for the critical phase conversion viscous-solid for this material system containing from 35 to 70% of polymer was determined in a subsequent laboratory experiment in a small discontinuous heatable kneader. This fact is very interesting and follows from the above description of the condensate balance in the screw evaporator, but is unnecessary for the carrying out of the process according to the invention since, as mentioned above, the screw process may be regulated optimally and in accordance with the invention in the open outlet zones by direct observation through viewing glasses. In this process, the ability to control the temperature of the various open and closed housing zones is an important aid, as portrayed in Example 2. It is important for the temperature in the open outlet zone, optionally lying upstream of the closed housing zone, to be raised only to such an extent that the critical phase conversion with its accompanying disadvantageous effects does not begin in the open area, and it is for this reason that 35% has not yet been exceeded in the present example of material.

It should be pointed out that as an alternative to the process as described in Example 2 it may also be carried out using a screw evaporator similar to the type described above but without the second opened outlet zone after the closed 300 mm housing zone. Thus, the screw evaporator is shortened by 250 mm to give a 900 mm screw length. At the end of this arrangement is the closed housing zone for the critical phase conversion. The flowable crushed solid then flows out of the machine with a polymer content of about 70% instead of 90% and may be further dried, as an easily manageable bulk product, in relatively simple apparatus, the screw machine being restricted in its use to the evaporation in the viscous range and the critical viscous-solid phase conversion.

What we claim is:

1. A process for the continuous concentration of liquid solutions, comprising the steps of:
   providing a screw evaporator with a closed housing zone having a discharge outlet;
   feeding a liquid solution into the screw evaporator;
   concentrating the liquid solution by evaporation in the closed housing zone;
   converting the liquid solution into the solid phase by further concentration in the closed housing zone;
   crushing the solid phase into a flowable solid material in the closed housing zone;
   conveying the vapors released during the concentrating, converting and crushing steps with the material unidirectionally towards the discharge outlet; and
   discharging the vapors along with the crushed solid material from the same discharge outlet of the closed housing zone.

2. The process according to claim 1, further comprising providing an outlet zone immediately upstream and immediately downstream of the closed housing zone.

3. The process according to claim 1, wherein the evaporating step is carried out by providing the closed housing at the end of the screw evaporator.

4. The process according to claim 1, wherein the evaporating step is carried out by providing at least one pair of inter-engaging screw shafts rotating in the same direction in the closed housing zone.

5. The process according to claim 4, wherein two pairs of screw shafts are provided.

6. The process according to claim 1, further comprising sealing against vapors advancing upstream of the closed housing zone by providing screws having a pitch in the closed housing zone which range from a larger to a smaller screw pitch in the downstream direction.

7. The process according to claim 1, further comprising providing a seal against vapors advancing upstream of the closed housing zone by providing a break thread with opposed twist in the closed housing zone on each of the screw threads of the screw evaporator.

8. The process according to claim 1, wherein the crushing of the dissolved substance is effected by providing a pitch in the closed housing zone which changes from a larger to a smaller screw pitch in the downstream direction for each of the screws in the screw evaporator.

9. The process according to claim 1, wherein the the crushing of the dissolved substance is effected by providing kneading conveying elements in the closed housing zone on each of the screws on the screw evaporator.

10. The process according to claim 1, further comprising facilitating vapor flow in the direction of conveyance by providing an increase in pitch at the downstream end of the closed housing zone on each of the screws used in the screw evaporator.

11. The process according to claim 1, further comprising facilitating vapor flow in the direction of conveyance by providing an increase in this thread depth at the downstream end of the closed housing zone in each of the screws of the screw evaporator.

* * * * *